(12) United States Patent
Beckwith et al.

(10) Patent No.: US 9,916,175 B2
(45) Date of Patent: Mar. 13, 2018

(54) MULTI-SESSION ZERO CLIENT DEVICE AND NETWORK FOR TRANSPORTING SEPARATED FLOWS TO DEVICE SESSIONS VIA VIRTUAL NODES

(71) Applicant: Objective Interface Systems, Inc., Herndon, VA (US)

(72) Inventors: R William Beckwith, Herndon, VA (US); J Nicolas Watson, Reston, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 217 days.

(21) Appl. No.: 15/008,219

(22) Filed: Jan. 27, 2016

(65) Prior Publication Data

US 2016/0216993 A1 Jul. 28, 2016

Related U.S. Application Data

(60) Provisional application No. 62/107,464, filed on Jan. 25, 2015.

(51) Int. Cl.
| | |
|---|---|
| *G06F 15/16* | (2006.01) |
| *G06F 9/455* | (2018.01) |
| *H04L 29/08* | (2006.01) |
| *H04L 12/931* | (2013.01) |
| *H04L 29/06* | (2006.01) |
| *H04L 12/24* | (2006.01) |

(52) U.S. Cl.
CPC .......... *G06F 9/45558* (2013.01); *H04L 49/70* (2013.01); *H04L 67/04* (2013.01); *H04L 67/08* (2013.01); *H04L 67/10* (2013.01); *H04L 67/141* (2013.01); *H04L 67/38* (2013.01); *H04L 67/42* (2013.01); *G06F 2009/4557* (2013.01); *G06F 2009/45595* (2013.01); *H04L 41/0803* (2013.01)

(58) Field of Classification Search
CPC ......... H04L 67/04; H04L 67/42; H04L 67/08; H04L 67/38; H04L 41/0803; H04L 67/10; H04L 67/141; H04L 49/70
USPC ....................................... 709/208, 220, 223
See application file for complete search history.

*Primary Examiner* — Kyung H Shin
(74) *Attorney, Agent, or Firm* — Vector IP Law Group; Robert S. Babayi (57) ABSTRACT

A network of nodes transports a plurality of flows from central nodes to a plurality of display sessions executing processes that operate under the control of one or more central operating systems. A plurality of isolated virtual nodes comprises 1) a plurality of virtual graphics nodes that concurrently process graphics flows used in the plurality of display sessions at the plurality of remote zero client nodes and 2) a plurality of virtual switches that switch the concurrently processed graphic flows from the virtual graphics nodes to the plurality of remote zero client nodes. Two or more graphic flows are used simultaneously in two or more display sessions at a single remote zero client node that executes a separating operating system for separating the two or more display sessions from each other based on a a separation policy for the two or more graphics flows.

20 Claims, 10 Drawing Sheets

MULTI-SESSION ZERO CLIENT DEVICE AND NETWORK FOR TRANSPORTING SEPARATED FLOWS TO DEVICE SESSIONS VIA VIRTUAL NODES

FIELD OF THE INVENTION

The present invention generally relates to the field of devices designed to receive a stream of information in a video or video-like format for user presentation and interaction (Zero Client or ZC devices), and more particularly to transport of information flows between the ZC devices over an overlay network having virtual machines functioning as virtual nodes (VNs) that separate or otherwise insulate information flow channels from each other.

BACKGROUND OF THE INVENTION

Providing robust separation between different realms of information processing remains a vexing challenge in complex computing equipment. There has existed a variety of strategies to achieving separation in such computing equipment. Unfortunately, while these separation strategies frequently achieve their separation properties they fail to support the user's needs for a rich computing experience with high performance computation of real-time graphics for three dimensional (3D) imaging and high definition video.

Evolution in the allocation of computation resources among local vs remote computing devices for end-user computing has significantly advanced the ability of much smaller, lower power end-user devices to present the user with the capabilities of vast array of computational resources resident in a remote computing center (e.g. cloud computing).

Early computers were large mainframe computers that were shared by users via shared peripherals such as punch card readers for batch processing of computational work. Subsequent mainframes allowed users to connect and use the mainframe computer using a rudimentary non-graphical terminal. These mainframe computers were called "time sharing" systems. Mainframe computers were typically housed in raised floor data centers with power redundancy, large (for the time) disk storage systems, and connections into fast (for the time) communication conduits. Since mainframes were so expensive, only the largest organizations had access to these computing resources.

The development of a single chip computer central processing unit (CPU) called a microprocessor enabled the market success of small, and initially slower, personal computers. Personal computers gave much wider access to computing capabilities. The microprocessors in personal computers eventually surpassed the computational speeds of large, single processor mainframe computers.

With the large number of distributed personal computers the requirements for connectivity became paramount. The communications market responded with improvements in high speed data links connecting most of the world's personal computers at data rates that were thousands of times faster than early communications over telephone lines.

The next major movement in computational allocation came with the rise of personal computing devices. These devices included smart phones, tablet computers, and other very small, lightweight computers. Microprocessors had advanced so significantly that the processor in smart phone was faster than early supercomputers costing millions as times as much.

The problem with personal computers and personal computing devices was that the users' data was stored in many different computers and devices. And these computers and devices were not good at allowing access to the data stored in another device without significant preplanning and preparation. In addition, the end-users' voracious appetite for processing and fast communications kept growing.

This resulted in a recentralization of computing, storage, and communications resources once again into large data centers. Centralizing the computing in a very large data center at the nexus of vast data storage and high-speed communications enabled new information system possibilities. But the challenge remained in presenting the user with a rich computing experience when the processing for that computing was remote.

Graphical user access to remote computing was developed in a constrained communications bandwidth environment. These constraints drove the design remote graphics protocols at the drawing instruction level are typically called a "thin client". Thin clients provided relatively low bandwidth requirements for simple word processing and spreadsheet graphical user interfaces. A very popular early implementation of a thin client protocol was the X Window protocol that originated at the Massachusetts Institute of Technology (MIT) in 1984. Paradoxically the X Windows realization of a thin client was called an X server.

"Thick" clients (also called "fat" or "heavy" clients) are full-featured computers connected to a network. One or more remote servers connected to thick clients over the network provide programs and files that are not stored on a computer's hard drive. Thick clients usually include relatively powerful CPUs that access hard drive and RAM for executing software applications under the control of a full-featured operating system, such as Microsoft Windows. Without exception, thick clients contain Graphical Processing Units (GPUs) that interface with the CPU via a high bandwidth interface, such PCI express, for rendering graphical presentations on an internal or external monitor without sharing graphical processing with remote servers.

"Thin" clients (also called "lean" or "slim" clients) are computers that execute computer programs that depend heavily on one or more servers to fulfill computational roles. Thin clients retain the GPU while exchanging graphical drawing instructions with software running on a server CPU. Since the graphical support subsystems of typical personal computer operating systems already sent graphical drawing instructions from the CPU to the GPU a simple implementation of separating graphical presentation with application computation was to have the operating system graphical subsystem send the drawing instructions over the network to a thin-client. In addition, for simple graphics sending graphical drawing instructions was reasonably conservative on network bandwidth consumption. However, more complex graphics such as three-dimensional (3D) graphics or high definition (HD) video consumed so much additional bandwidth as to make the communication between the CPU and GPU impractical over network latencies and bandwidth. Even within a high performance personal computer the highest bandwidth communication such as PCIExpress with 80 to 800 times the bandwidth available to thinnest clients is used for communication between the CPU and the GPU. Thin clients usually include relatively less powerful CPUs under the control of an operating system that interfaces with a GPU optimized for use with simple lines, curves, and text, rapidly drawn by the client using predefined logic and cached bitmap data. In this regard, thin clients work well for basic office applications such as spreadsheets, word processing, data entry, and so forth, but are not suited for rendering high definition graphics.*

"Zero" clients (also known as "ultrathin" client) are applications or logic operating on devices communicating with server-based computers. A typical ZC device connects remote servers to a keyboard, mouse, and graphics display interface for an internal or external display via a wired or wireless network connection. The remote servers host the operating system (OS) for running the client's software applications. A common implementation of this approach is to host multiple desktop operating system instances on a server hardware platform running a hypervisor. The hypervisor contains computer software, firmware or hardware that creates and runs virtual machines. This strategy of virtualizing the OS or applications for a desktop is generally referred to as "Virtual Desktop Infrastructure" or "VDI".

Various types of separating operating systems (SOS) are known. For example, Security-Enhanced Linux (SELinux) is a Linux kernel security module that provides a mechanism for supporting access control security policies that can be configured to separate multiple processing concerns. SELinux is a set of kernel modifications and user-space tools that separate enforcement of security decisions from the security policy enforcement. SE Linux implements a configurable policy engine that allows for separate processing of different information domains.

The United States National Security Agency (NSA), the original primary developer of SELinux, released the first version to the open source developer community under the GNU GPL on Dec. 22, 2000. Another example of a separating operating system is Separation Kernel (SK) operating system specified by an NSA Protection Profile entitled "U.S. Government Protection Profile for Separation Kernels in Environment Requiring High Robustness" (SKPP). Examples of SKs are Lynx Software's LynxSecure, Wind River's VxWorks MILS and Green Hills' INTEGRITY-178B. An SK implements a safety or security policy that partitions processing workloads on nodes. Each node has one or more processing units can runs applications as well as virtualizing one or more OS images. The SK's primary function is to partition or otherwise separate resources into policy-based equivalence classes and to control information flows between subjects and resources assigned to the partitions according to the SK's configuration data.

Virtualization is an abstraction layer that decouples the physical hardware from the operating system to deliver greater resource utilization and flexibility. A hypervisor is a set of software logic potentially augmented by hardware logic sometimes known as a host that executes one or more operating systems sometimes known as guests. A hypervisor enhanced to separate the guest operating systems would be a form of separating operating systems. An example hypervisor qualifying as separating operating system is the ESX hypervisor by VMware that allows multiple guest virtual machines, with heterogeneous operating systems (e.g., Windows and Linux) and applications to run in isolation, side-by-side on the same physical machine. A guest virtual machine has its own set of virtual hardware (e.g., RAM, CPU, NIC, hard disks, etc.) upon which an operating system and applications are loaded. The operating system sees a consistent, normalized set of hardware regardless of the actual physical hardware components. PikeOS from Sysgo allows virtualization of operating systems (OS), Application Programing Interface (APIs), and real-time embedded (RTE) in separate partitions.

Remote Desktop Protocol (RDP) is a proprietary protocol developed by Microsoft, which provides ZC devices with graphical interfaces to connect to another computer over a network connection. Known remote display protocols from Microsoft (RemoteFX), Teradici (PCoIP) and Citrix (HDX) provide interfaces between VDI and the ZC devices. One such ZC device connects peripheral input-output devices, e.g., a keyboard, mouse, and display interfaces, audio interface, USB interface, to a Microsoft Windows desktop virtual machine, where a remote controller, e.g., at a site, runs VDI on a hypervisor server.

Also known are Virtual Graphics Processing (VGP) Units, vGPUs, that enable sharing of graphics processing for virtual desktops. When utilizing vGPUs, the graphics commands from virtual machines are passed directly to the GPU with or without hypervisor translation. Under this arrangement a GPU is virtualized with virtual machines running native video drivers. For example, NVIDIA's GRID™ technology is comprised of both hardware and software which enables hardware virtualization of GPUs. The Dell PowerEdge R720 servers are examples of servers that can accommodate NVIDIA GRID™ cards to enable high-end graphics applications at the ZC devices, which do not have the processing hardware for high definition graphics.

Networks for transport or delivery of end-to-end information flows, such as video flows or other graphical streams, are known. One such network employs a single or parallel overlay networks that are built on top of an underlying IP network. Overlay networks execute overlay processes, e.g. PCS processes or middleware in nodes connected by logical links, each of which corresponds to a logical flow channel formed through many physical links on the underlying network. One known overlay network that delivers live flows is disclosed by Yair et al. in U.S. Pat. No. 8,619,775 B2, titled "Scalable Flow Transport And Delivery Network And Associated Methods And Systems."

It is known to use communication controllers in overlay networks to separate flow communication amongst nodes. One system that separates flows transported on flow channels is disclosed by Beckwith et al. in U.S. Pat. No. 8,045,462, titled "A Partitioning Communication System" (PCS), which is assigned to Objective Interface Systems Inc., the assignee of the present application. The PCS implements a resource management policy for sharing the one or more resources, where the resource management policy also defines how the one or more channels influence each other. The PCS comprises a communication controller within a node that communicates data with another node over separated channels. The communication controller deploys overlay processes, which provides inter-node communications amongst nodes that are run under the control of a SK.

With the advances in the power of processing units, systems have provided scalable delivery of flows. However, there exists a need for a flow delivery network that supports any-to-any high quality flows to ZC devices that support multi-session.

SUMMARY OF THE INVENTION

Briefly, according to one aspect of the present invention, a network of nodes is configured to transport a plurality of flows from one or more central nodes to a plurality of display sessions executed in a plurality of remote zero client nodes. A plurality of central processing units in the one or more central nodes are configured to execute a plurality of processes that operate under the control of one or more central operating systems. A plurality of virtual nodes in the one or more central nodes are isolated from each other by hardware simulation. The plurality of virtual nodes comprise 1) a plurality of virtual graphics nodes configured to concurrently process graphics flows used in the plurality of display sessions at the plurality of remote zero client nodes and 2) a plurality of virtual switches that switch the concurrently processed graphic flows from the plurality of virtual graphics nodes to the plurality of remote zero client nodes. A virtual node is isolated from another virtual node by isolating a virtual graphic node and virtual switch in the virtual node from another virtual graphic node and virtual switch in the other virtual node. A plurality of sender and receiver nodes are configured to transport two or more graphic flows over the network. The two or more graphic flows are used simultaneously in two or more display sessions at a single remote zero client node. The zero client node executes a separating operating system for separating the two or more display sessions from each other based on a separation configuration that implements a separation policy for the two or more graphics flows.

According to some of the more detailed features, a virtual node hosts a desktop operating system allowing the single remote zero client device to access an application. The plurality of virtual nodes further comprise a plurality of virtual audio nodes configured to concurrently process audio flows used in the plurality of display sessions at the plurality of remote zero client nodes. The plurality of virtual nodes can further comprise a plurality virtual network interface cards coupled to the plurality of virtual switches.

According to still other more detailed features of the invention, the two or more graphic flows are displayed according to a remote desktop protocol comprising at least one of RemoteFX, PCoIP or HDX. A virtual infrastructure client cane be configured to interface with the single remote zero client node. Each virtual graphics node executes a virtual graphics application to generate a graphic flow, said virtual graphics application comprising at least one of Silverlight, Flash, Windows Aero. In one embodiment, the virtual graphics application can be an interactive application. In another embodiment, the one or more central operating systems comprise a plurality of separating operating systems, each controlling one of the plurality of virtual nodes.

In still anther more detailed aspect of the invention, the network comprises an overlay network is a network of overlay processes executing on overlay nodes connected to each other by logical (or virtual) links in a computer network that is built on top of an underlying network of nodes.

According to another aspect of the present invention, a system and method that transports a plurality of flows comprises one or more central nodes having a plurality of central processing units. The plurality of central processing units are configured to execute a plurality of processes that operate under the control of one or more central operating systems.

A plurality of virtual nodes are in the one or more central nodes, wherein each virtual node is configured to execute processes that isolate said plurality of virtual nodes from each other. The plurality of virtual nodes are isolated based on hardware simulation of 1) a plurality of virtual graphics nodes that concurrently process graphics flows used in a plurality of the display sessions at the plurality of remote zero client nodes and 2) a plurality of virtual switches that switch packets associated with the concurrently processed graphic flows. A plurality of sender and receiver nodes are configured to transport two or more graphic flows that are used simultaneously in two or more display sessions at a single remote zero client node. A plurality of zero client nodes are remote to the one or more central nodes and each executes a separating operating system for separating the two or more display sessions from each other based on a separation configuration that implements a separation policy for the two or more graphics flows.

DESCRIPTION OF THE INVENTION

The present invention is described herein according to the following definitions:

Definitions

A Multi-session Zero-client (MZC) device is any device comprising 1) a wired or wireless network interface for receiving at least two separate flows 2) multiple sessions, each configured to interface with one flow and 3) multiple I/O interfaces associated with each session.

A session is one or more processes that facilitate interactive exchange of flows between a node and a remote node.

A display session is a session that displays a graphics flow.

A process is an algorithm or method executed in a processing unit.

A processing unit is the basic unit of computation provided by a CPU that can execute independent IO and computation tasks. For example, in a multi-core CPU it would be a core, in a single-core CPU it would be the CPU itself.

A node comprises one or more processing units running processes that perform I/O functions.

A virtual node (VN) is any node or machine that executes one or more processes that are virtualized to separate or otherwise isolate nodes or machines from each other by hardware simulation.

A flow is a series of related packets communicated amongst a sender node and one or more receiver node(s), e.g., audio flow, video flow.

A receiver node is a node that executes a process for receiving flows.

A sender node is a node that executes a process for sending flows.

A protocol is a set of conventions governing the treatment or the formatting of data in an electronic communications system.

A logical link comprises a path formed along multiple physical links connecting the nodes of an underlying network.

An operating system (OS) is a computer program executed in one or more processing units that is responsible for the management and coordination of activities and the sharing of resources. OS instances can be executed on different hardware, in different Virtual Machines, or both.

A separating operating System (SOS) is an OS that separates actual and/or virtual resources and processes based on a separation configuration that implements a separation policy.

An overlay node is a node that executes an overlay process.

An overlay process is a process involved in creating and maintaining an overlay network that transport flows according to an overlay protocol.

An overlay protocol is a protocol for controlling flows between at least two overlay processes based on a defined policy that relates to connectivity, routing of flows and/or communicating messages in an overlay network. The overlay protocols in different overlay networks can be based on the same or different policies.

An overlay network is a network of overlay processes executing on overlay nodes connected to each other by logical (or virtual) links in a computer network that is built on top of an underlying network of nodes.

A resource is any processing power, communication bandwidth, hardware, firmware, data, and/or virtual machine that is executed, utilized, created, or protected in each node.

A tunneling protocol allows a network user to access or provide a network service that the underlying network does not support or provide directly.

Overall System

Figure 1:
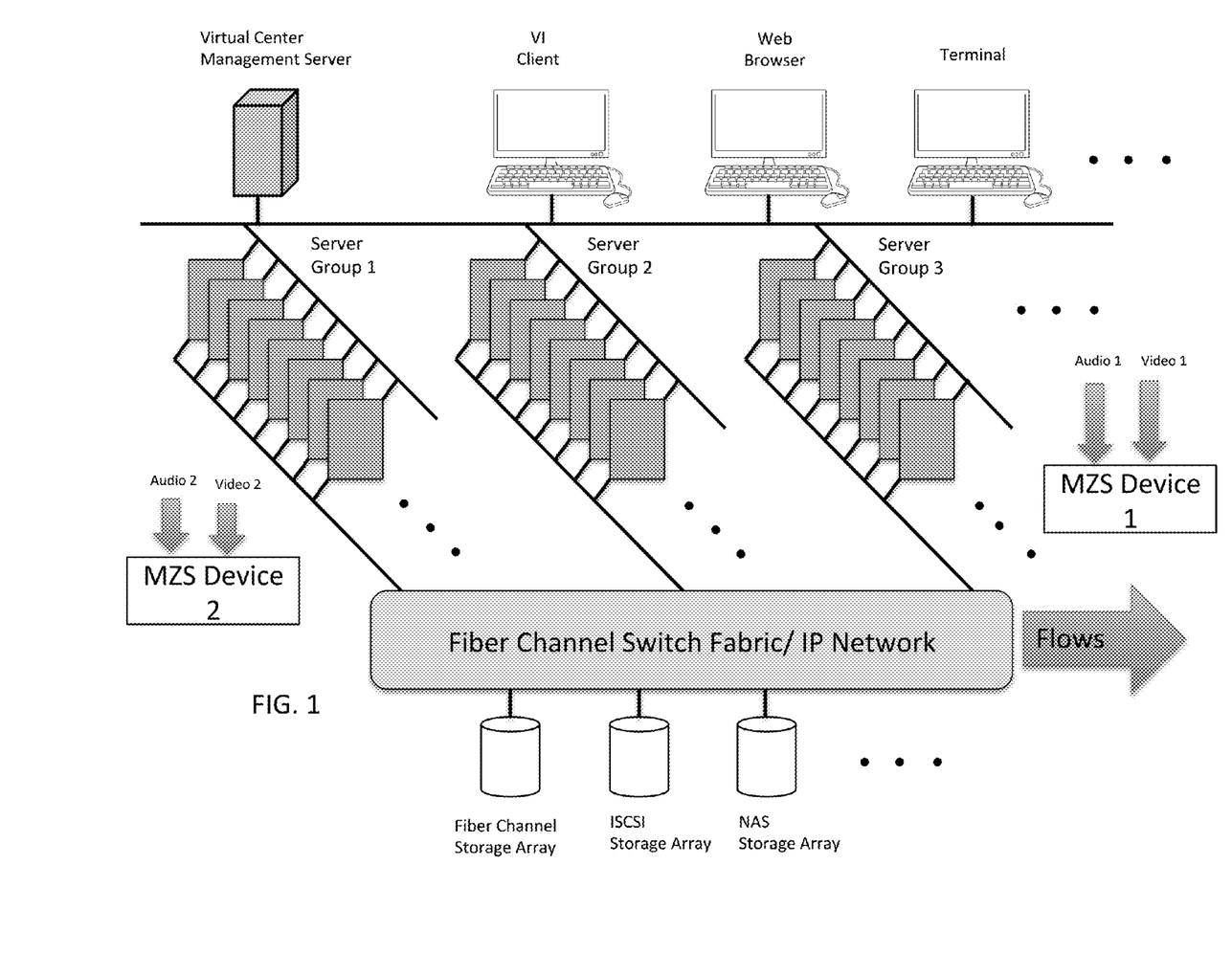
FIG. 1 shows physical topology of a site that incorporates present invention.

FIG. 1 shows physical topology of a site comprising computing servers, such as industry standard x86 servers that run under the control of one or more server operating systems, such as Windows, Linux, or VMware that create virtual or non-virtual environments. A number of similarly configured x86 servers can be grouped together with connections to the same network and storage subsystems to provide an aggregate set of resources. Enterprise storage arrays, such as Fiber Channel Storage Area Network (SAN) arrays, iSCSI SAN arrays and Network Attached Storage (NAS) arrays, are used to meet different storage needs. Sharing the storage arrays between (by connecting them to) groups of servers via storage area networks allows aggregation of the storage resources A multi-session ZC (MZC) device according to the present invention receives at least two separate flows for a plurality of sessions transported, for example, over the Internet and/or an overlay network built on top of the Internet. FIG. 1 shows servers transporting at least two separate flows, e.g., an audio flow and a separate video flow, to each one of MZS 1, MZS 2 to MZC n. The system of FIG. 1 instantiates multiple Zero Client (ZC) applications under the control of a separating operating system that has a configurable policy engine for separating processing of different information domains or partitions. The kernel of the operating system is configured run many ZC applications separately. As such, a network of nodes are configured to transport a plurality of flows from one or more central nodes to a plurality of display sessions executed in a plurality of remote zero client nodes.

Separating OS:

The network includes a plurality of central processing units in the one or more central nodes that are configured to execute a plurality of processes that operate under the control of one or more central operating systems. In one embodiment, the servers operate under the control of a separating operating system (SOS) that provides separation via a configurable policy engine (PE) that implements a defined separation policy. One example of a SOS is SELinux. Other examples include VMware Hypervisor, Sysgo PikeOS, Wind River's VxWorks MILS, and Green Hills' INTEGRITY. The configurable PE assures safety through strict time and resource partitioning. Resources such as flow channels are separated for transporting flows. In one embodiment, the SOS achieves separation or isolation of processes via virtualization such that each process encompasses a resource set that appears to be entirely its own. For example, in order to achieve virtualization for resources that can be accessed by the processes, such as communication resources for transporting multiple separated or otherwise isolated flows from each other, the SOS can be configured so that the temporal usage patterns from different processes are not apparent to each other. Other resources (Rs), such as memory, may be accessed by different processes simultaneously while preserving necessary separation and or isolation. Furthermore, the SOS utilization of its own internal resources R may also preserve the desired separation properties. The SOS can also provide audit services for detecting failure, such as, for example, a security failure, a system failure, or an attempted security breach.

SOS Configuration:

The PE is configurable to establish definitions and allocation of resources. The SOS configuration data provides the control information used by a node during initialization to define the secure initial state and its behavior during runtime. In one embodiment, the SOS configuration data consists of flow policy configuration data and supporting policy configuration data, which define the information flow control and process control policies for communication between and within nodes. SOS non-flow policy configuration data defines all other configurable critical data, such as audit configuration parameters, cryptographic configuration parameters, clock settings, and execution period for self-test. The content and format of the OS configuration data may take different forms, depending on the scope and granularity of the information flow control and flow control policies that are enforced as well as on other factors of system design. The SOS divides all resources R under its control such that the actions of one process are isolated from and cannot be detected by or communicated to another process, unless an explicit means for that communication has been established by the OS configuration data.

In one embodiment, at least some of the servers of FIG. 1 create a virtual environment, where a Virtual Center Management Server (VCMS) acts as a central point for configuring, provisioning and managing the data center site. In one embodiment, a Virtual Machine File System (VMFS) provides cluster file system for virtual machines. A Virtual Symmetric Multi-Processing (SMP) enables each virtual machine to use multiple physical central processors or processing units simultaneously. Each computing server can be a standalone Host in the virtual environment that provisions virtual machines. The VCMS unifies the resources from the individual computing servers to be shared among virtual machines in the entire data center by managing the assignment of virtual machines to the computing servers. The VCMS also manages the assignment of resources to the virtual machines within a given computing server based on the policies set by the system administrator. The data center site provides interfaces for data center management and virtual machine access. Users can choose the interface that best meets their needs: Virtual Infrastructure Client (VI Client), Web Access through a Web browser, or terminal services (such as Windows Terminal Services).

Through a Virtual Infrastructure Client (VIC), the servers interface with the MZC devices 1 and 2 over a network, such as the Internet (or any overlay network built on top of the Internet as further described below). As shown in FIG. 1, a network interface provides two separate flows, e.g., audio and video, to each the MZC devices 1 and 2.

Virtual Graphics Processing (VGP)

Figure 2:
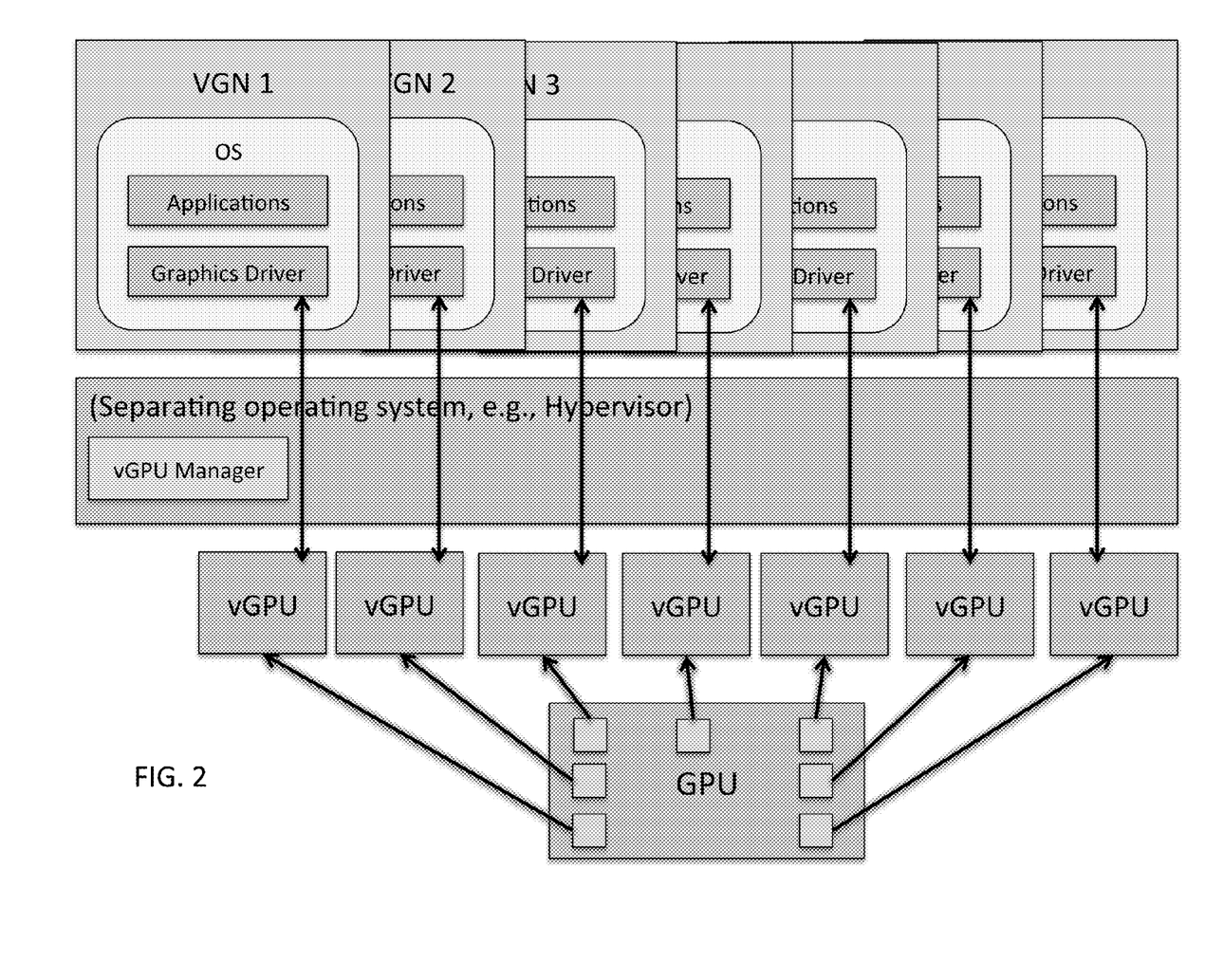
FIG. 2 shows a block diagram of a Virtual Graphics Processing architecture that generates video flows.

FIG. 2 shows an example of a VGP architecture of a plurality of virtual graphic nodes (VGNs) implemented in the site of FIG. 1. The VGP architecture utilizes virtual GPUs (vGPUs) that provide the benefit of hardware-accelerated graphics to the MZC device shown in FIG. 1. One such virtual graphics solution is implemented in NVIDIA's GRID vGPUs, which provides graphics performance by sharing a GPU among multiple MZC devices. This allows sharing GPU hardware acceleration between multiple MZC devices without compromising the graphics experience. In one embodiment, the graphics commands of each VGN are passed directly to the GPU, without translation by an intervening operating system. This allows the GPU hardware to be time-sliced to generate flows at VGNs via shared virtualized graphics performance.

Virtual Graphics Applications (VGAs), such as media (Silverlight and Flash), GUI (Windows Aero), interactive applications (gaming), can be executed by vGPUs to generate flows at the VGNs. In one embodiment, a plurality of virtual graphics nodes are configured to concurrently process graphics flows used in the plurality of display sessions at the plurality of remote zero client nodes. Such concurrent processing allows multiple display sessions to be executed at the same time and use the concurrently processed graphics flows in each remote zero client device. In this way, a plurality of sender and receiver nodes can be configured on one or more central nodes, e.g., in the cloud, to transport two or more graphic flows over the network. The two or more graphic flows are used simultaneously in two or more display sessions at a single remote zero client node. Each remote zero client node executes a separating operating system for separating the two or more display sessions from each other based on a separation configuration that implements a separation policy for the two or more graphics flows.

The generated flows are transported based on remote display protocols, such as RemoteFX. A VDI can manage the VGAs and resources at the data center site instead of at the MZC device. The MZC devices can share one or more vGPUs on a Hyper-V server. Optionally, the MZC devices can have local GPU power that provides auxiliary support to the decoding and rendering of the multiple streams of video tiles encoded by the remote vGPUs. Under VGP architecture described above, users can experience enhanced graphics without having to upgrade to a higher class of device. Video conferencing tools and rich-media content can be managed under the VDI seamlessly for single, multi-display, and/or multi-screen screen configurations at the MZC device.

As described above, a plurality of virtual nodes in the one or more central nodes are isolated from each other by hardware simulation. The plurality of virtual nodes comprise a plurality of virtual graphics nodes configured to concurrently process graphics flows used in the plurality of display sessions at the plurality of remote zero client nodes. A plurality of virtual nodes in the one or more central nodes are isolated from each other by hardware simulation. The plurality of virtual nodes comprising a plurality of virtual graphics nodes configured to concurrently process graphics flows used in the plurality of display sessions at the plurality of remote zero client nodes. By concurrent processing of graphic flows, the two or more flows can be used simultaneously in two or more display sessions at a single remote zero client node. In this way, multiple sessions can be displayed on such remote zero client node.

Virtual Audio Processing (VAP)

Figure 3:
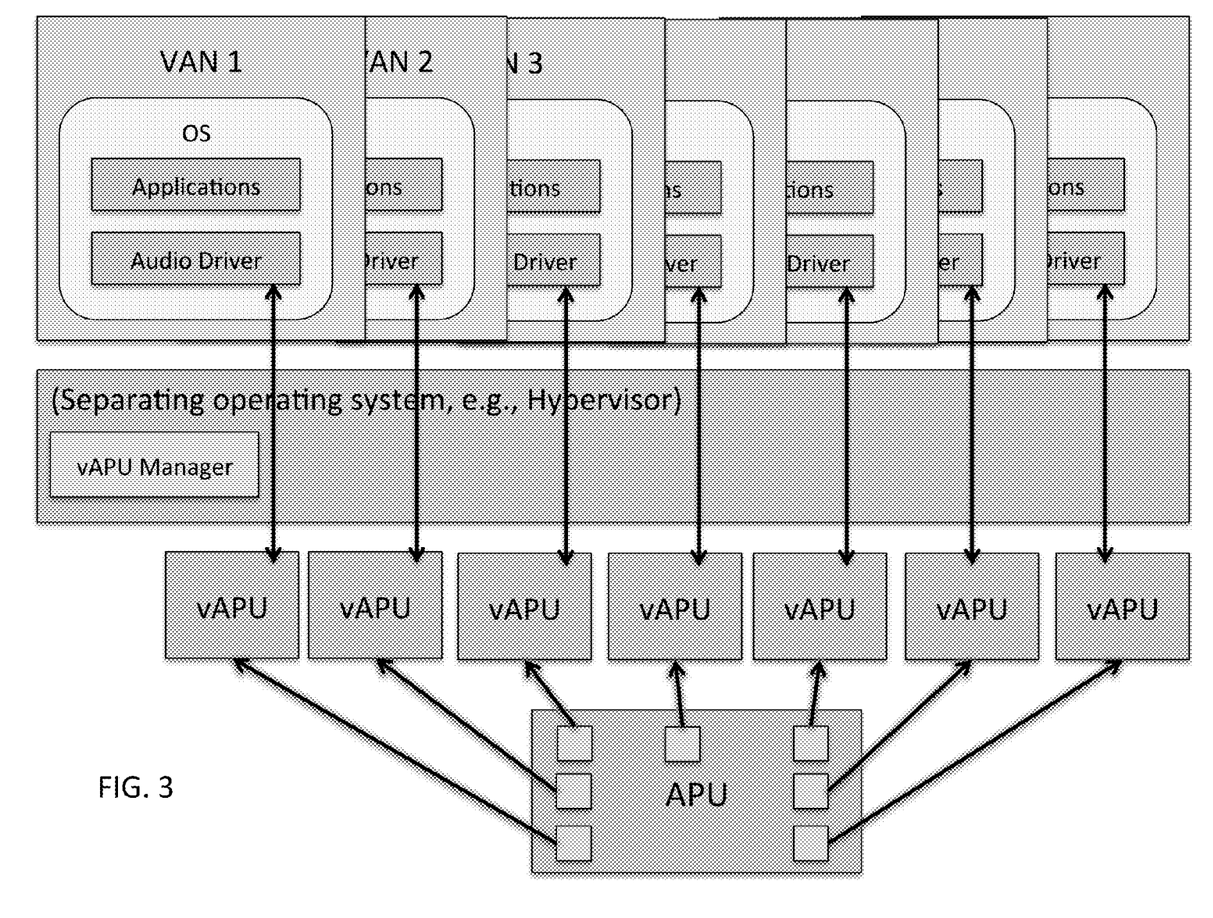
FIG. 3 shows a block diagram of a Virtual Audio Processing architecture that generates audio flows.

FIG. 3 shows an example of a Virtual Audio Processing (VAP) architecture that utilizes virtual audio processing units (vAPUs) for generating audio flows in a plurality of virtual audio nodes. The VAP generates separate audio flows by taking advantage of virtualization similar to the one described in connection with the VGP of FIG. 2.

IP Network Architecture

Figure 4:
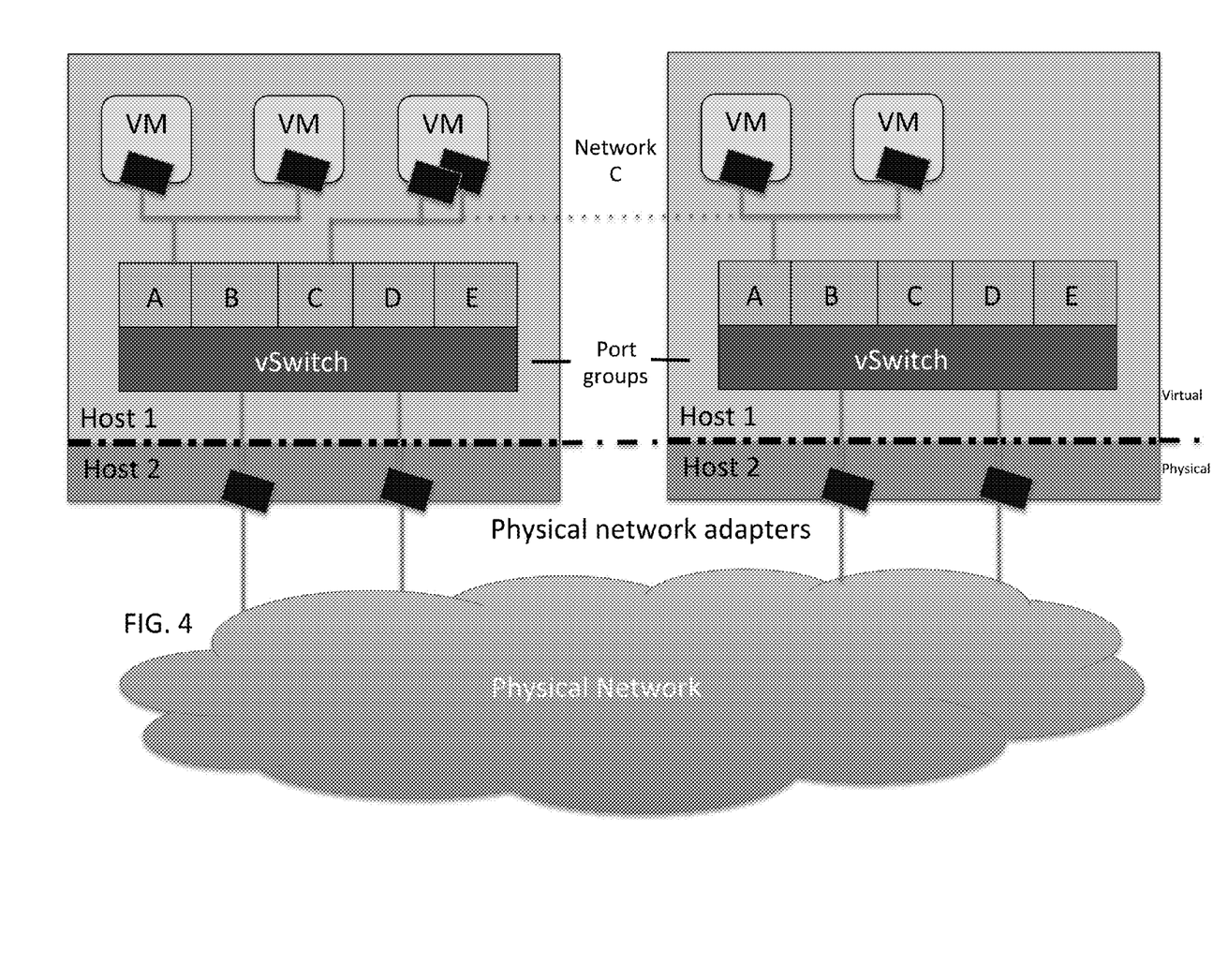
FIG. 4 shows a block diagram of an IP network interface with ZC devices.

FIG. 4 shows a block diagram of the network interface within a virtual environment. The virtual environment provides similar networking elements as the physical world. They are virtual network interface cards (vNIC), virtual switchs (vSwitch) and Port Groups. Like a physical machine, each virtual machine has its own vNICs. The operating system and applications interface with the vNICs through a standard networking device driver just as though the vNIC is a physical NIC. To the outside world also, each vNIC appears just like a physical NIC, which has its own MAC address, one or more IP addresses and it responds to the standard Ethernet protocol exactly as a physical NIC would. A vSwitch works like a Layer 2 physical switch. Each physical server has its own vSwitches. On one side of the vSwitch are Port Groups, which connect to virtual machines. On the other side are uplink connections to physical Ethernet adapters on the server where the vSwitch resides. Virtual machines connect to the outside world through the physical Ethernet adapters that are connected to the vSwitch uplinks. A virtual switch can connect its uplinks to more than one physical Ethernet adapter to enable NIC teaming two or more physical adapters used to share the traffic load. Based on the foregoing, a plurality of virtual switches switch concurrently processed graphic flows from the plurality of virtual graphics nodes to the plurality of remote zero client nodes. Each virtual node is isolated by isolating a virtual graphic node and virtual switch in a corresponding virtual node from another virtual graphic node and virtual switch in another corresponding virtual node. Alternatively, each virtual node is configured to execute processes that isolate said plurality of virtual nodes from each other based on hardware simulation of a plurality of virtual graphics nodes that concurrently process graphics flows used in a plurality of the display sessions at the plurality of remote zero client nodes and a plurality of virtual switches that switch packets associated with the concurrently processed graphic flows. A plurality of sender and receiver nodes are configured to transport two or more graphic flows that are used simultaneously in two or more display sessions at a single remote zero client node. Based on the foregoing, a plurality of virtual switches switch the concurrently processed graphic flows from the plurality of virtual graphics nodes to the plurality of remote zero client nodes. Under this arrangement, a virtual node is isolated by isolating a virtual graphic node and virtual switch in a corresponding virtual node from another virtual graphic node and virtual switch in another corresponding virtual node.

Alternatively, each virtual node is configured to execute processes that isolate said plurality of virtual nodes from each other. Such isolation is based on hardware simulation of the plurality of virtual graphics nodes that concurrently process graphics flows used in a plurality of the display sessions at the plurality of remote zero client nodes and the plurality of virtual switches that switch packets associated with the concurrently processed graphic flows.

According to one feature of the invention, a plurality of sender and receiver nodes configured to transport two or more graphic flows that are used simultaneously in two or more display sessions at a single remote zero client node.

Multi-session Zero Client Devices (MZCs)

Figure 5:
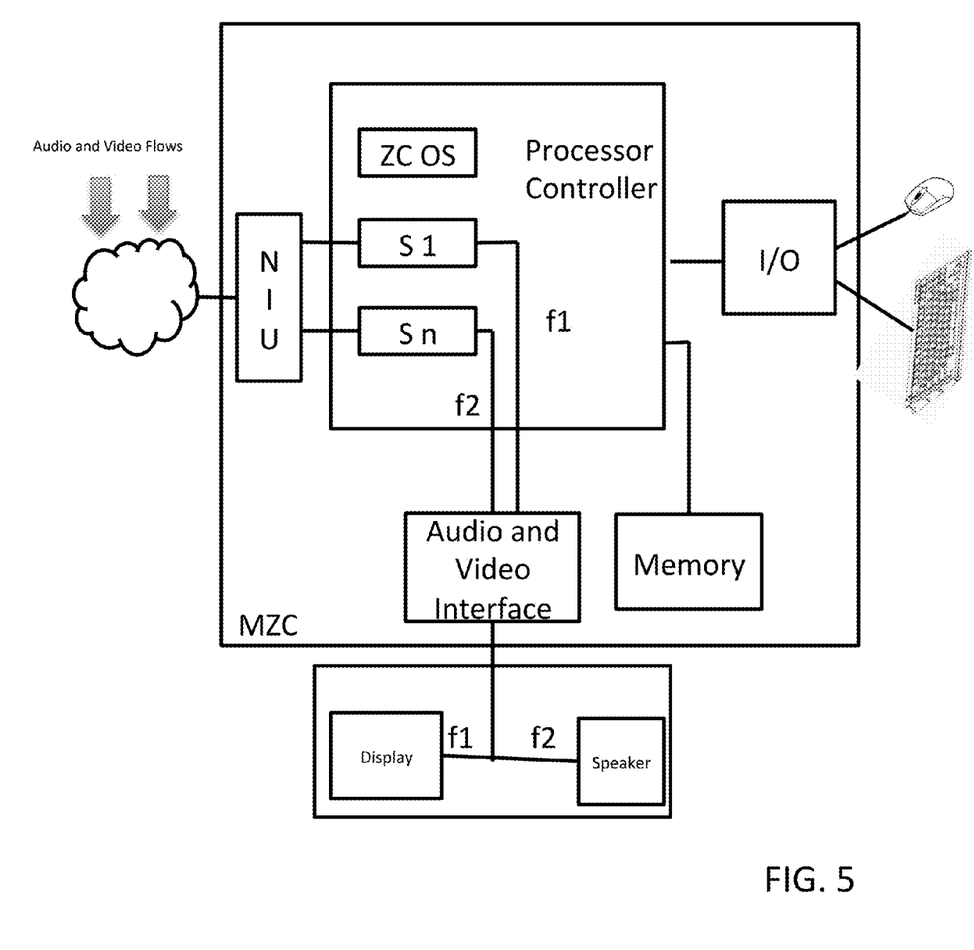
FIG. 5 shows a block diagram of an MZC device according to one embodiment of the invention.

FIG. 5 shows a block diagram of an MZC device that interfaces with the servers of FIG. 1 via the network of FIG. 4 to receive flows via a network interface units (NIU) at the MZC device. The MZC device can access applications under a VDI environment, which hosts desktop operating systems within virtual machines running on a server. Any suitable remote display protocol, such as RemoteFX, PCoIP and/or HDX, can provide graphical interfaces between VDI and the ZC devices.

The MZC device has a processor/controller that interfaces with audio and video/graphics devices to render audio and video flows separately, e.g., on a monitor and a speaker. In this way, the MZC device connects Audio/Video interfaces, or any other I/O interface, to corresponding virtual machines, e.g., VGNs and or VANs shown in FIGS. 2 and 3.

The controller operates under the control of a ZC OS stored in a memory device to enable flow channels to a plurality of sessions, e.g., an audio session for the received audio flow and a video session for the video flow. Flows are delivered over the Internet to the destination address, e.g. IP address, of the MZC device. In this way, the MZC device can process multiple sessions associated with separate flows.

For example, one flow can contain GUI information while the other separated flow can contain video content. Interactive contents associated with gaming can be handled via another session that receives a flow containing interactive gaming information. For example, multiple GUIs associated with the same or different operating systems or web browsers can be displayed on a single display device attached to the MZC device. The multiple GUIs can be presented to the user in simultaneously in different sub-windows or one-at-a-time in the style of a keyboard-video-mouse (KVM) device. Moreover, the MZC can be equipped with a smart card reader, built-in audio/video input and output that connect to one or more virtual machines via the network. A microphone can be connected to the MCZ device to receive audio input for sending to one or more sessions to the servers. A sound output device such as a speaker or audio output jack can be connected to the MCZ device to play audio output for each session from the servers. Internal or external displays render video flows. Optionally, the MZC device can be equipped with auxiliary GPU power that supports virtual graphical processing units.

Overlay Flow Transport Network

Figure 6:
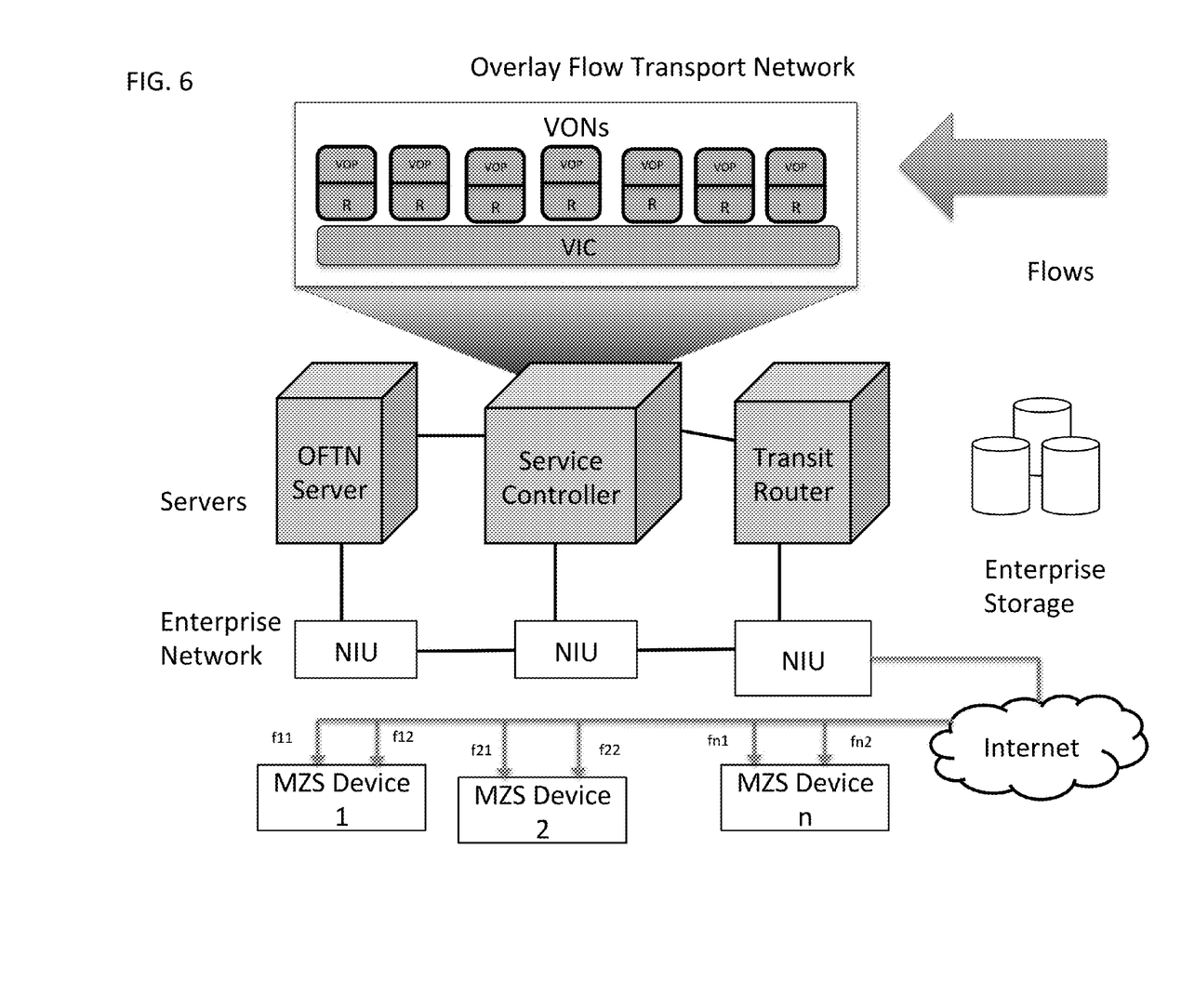
FIG. 6 shows an Overlay Flow Transport Network (OFTN).

In another embodiment of the present invention, FIG. 6 shows an Overlay Flow Transport Network (OFTN) that delivers flows over one or more overlay nodes. One such overlay network is disclosed by Beckwith et al. in U.S. Pat. No. 8,045,462, titled "A Partitioning Communication System" (PCS), which is hereby incorporated by reference in its entirety. In one embodiment, a tunneling protocol allows PCS to run over the Internet to create separate IP tunnels that act as separated flow channels. The tunneling protocol works by using the data portion of a packet (the payload) to carry the packets that actually provide the service. A Tunnel Setup Protocol (TSP) is used as a networking control protocol to negotiate IP tunnel setup parameters between tunnel end points, namely, the MZC devices and one or more tunnel broker servers.

In another embodiment, the flows are transported over one or more overlay networks of overlay nodes, such as PCS nodes, implemented on top of one or more underlying networks. For example, the underlying network can be any type of public or private network, and can be an IP network or the Internet. Communication over the OFTN may use any suitable combination of layers (such as physical, link, network, or transport) that support any standard or proprietary communication protocols. Examples of transport protocols that are suitable for transporting data across the system of the invention comprise any real time or non-real time protocols. The transport layer may also support transport technologies with or without Quality of Service (QoS), such as ATM or TCP/IP. The link connecting nodes across the network can be a wired link, such as one defined by IEEE 802.3, or a wireless link, such as one defined by IEEE 802.11x. Examples of physical layer used the in the system of the present invention include twisted pair, coaxial cable, optical cable, or any known suitable wiring or wireless technologies. In one embodiment, each node runs under the control of an operating system that supports real-time processor scheduling.

Preferably, the OFTN is highly scalable managed network designed to deliver live or near-real-time flows over an overlay network of virtual overlay nodes (VONs), such as virtualized PCS nodes. The OFTN architecture uses threads within processes in order to utilize multi-core processor architecture for implementing the VONs. In one embodiment, virtual overlay processes (VOPs) are executed in the VONs under strong separation and protection against side effects between the different VONs, and fault independence. Flows comprising images, graphical user interfaces (GUIs), screens, live video, and interactive game content or any other graphical content can be transported over the OFTN. Each flow can have multiple destination nodes and each source node can have multiple flows supporting broadcasting, unicasting, any casting and multi-casting.

VOPs within the scope of control of VONs perform various functions, for example, inter-node communication functions. Resources (Rs) may be used by processes individually or simultaneously to allow the processes to access the resources. Resources may also comprise transport, network, link, communication bus, I/O bus, memory bus, hardware or software encryption unit, socket library, protocol stack, device driver, graphics driver, etc.

An OFTN server acts as a central point for configuring, provisioning and managing the OFTN. Through a Virtual Infrastructure Client (VIC), the OFTN provides interfaces to the MZC devices that connect to the OFTN server over the Internet (or any other underlying network).

A service controller controls the delivery of specific flows to specific destination nodes in the OFTN or at the MZC devices based on service requests received from the destination nodes. In one embodiment, physical or virtual access nodes receive flows from and send flows to the OFTN through one or more transit routers. The service requests can include mapping information for mapping the flows with the VOPs, for example based on flow and processes identification codes. VOPs can also be assigned to one or more resources R based on gathered information about link status, resource utilization, etc. FIG. 1 shows OFTN transporting at least two separate flows to each one of MZS 1, MZS 2 to MZS n.

The OFTN utilizes multi-core processors that instantiate several virtual machines on each physical machine, such that the overlay node processes running on a physical machine can be divided between the VONs. In one embodiment, a Virtual Symmetric Multi-Processing (SMP) enables each virtual machine to use multiple physical processors simultaneously. In order to support interactive and real-time flows, the end-to-end delay and jitter is minimized. In one embodiment, flows are routed from an input port to the output port of the I/O interface through the system memory, without storing any part of the flow onto the persistent storage. The OFTN is scalable via virtualization to support high capacity graphic flow transport. It is also scalable with the number of source nodes and receiver nodes implemented in virtual machines and MZC devices. In this way the OFTN could be used to provide high-quality and real-time content flows, such as Standard Definition (SD) and/or High Definition (HD) video, GUI, online game support and other multimedia over the Internet for viewing or distribution to millions of ZC devices at various locations in small or large geographic areas. The OFTN comprises one or more virtualization layers that are run on physical servers that abstract processor, memory, storage and networking resources to be provisioned to multiple virtual machines.

Preferably, each server has multiple gigabit Ethernet network interface cards (NIUs) to provide high bandwidth and reliable networking to the OFTN. Virtual Infrastructure Client (VIC) provides interfaces to administrators and MZC devices to connect remotely to the OFTN. Transit routers rout flows to a plurality of overlay nodes executing overlay processes associated with the overlay network. Each transit router can communicate with one or more access nodes on a network, e.g. a LAN, WAN, wired or wireless.

Overlay Multi-Session Zero Client Devices (MZCs)

Figure 7:
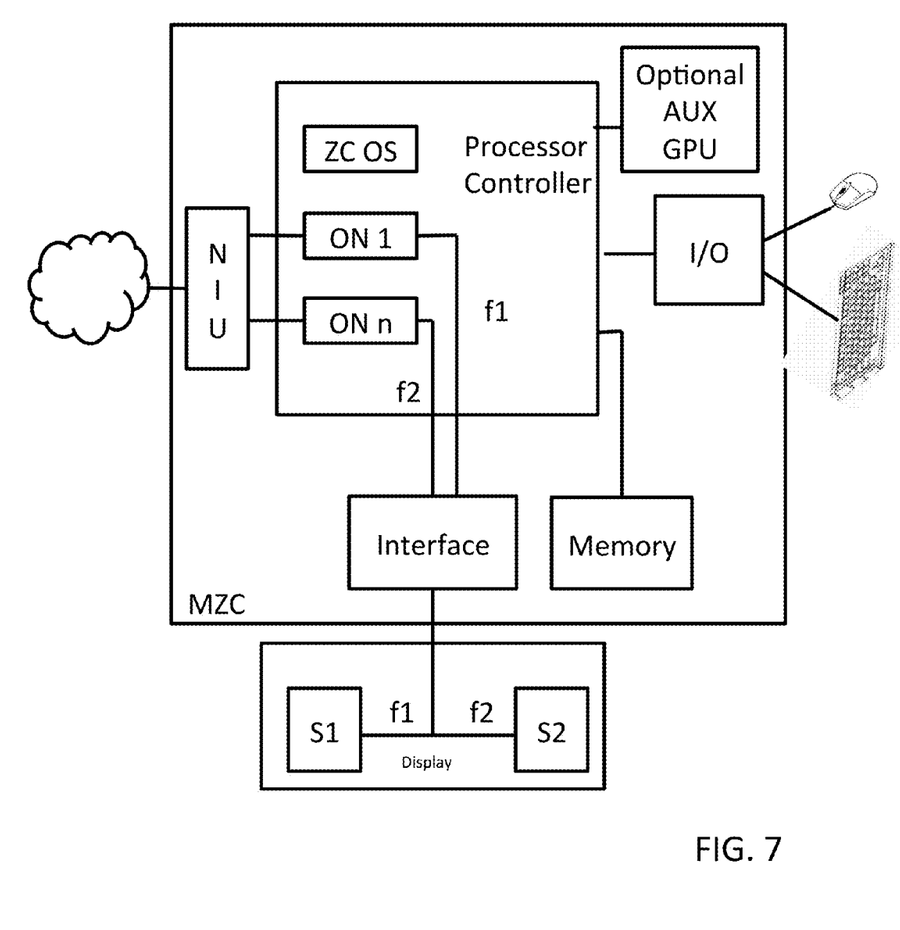
FIG. 7 shows a block diagram of an MZC device according to another embodiment of the invention.

FIG. 7 shows a block diagram of an MZC device that processes a plurality of MZC overlay nodes ON 1 . . . ON n. The MZC overlay nodes could be actual or virtual nodes. The plurality of MZC overlay nodes provide a plurality of flow channels for receiving a plurality of flows (f1 and f2) transported over the OFTN. The flows are applied to a Graphical Interface Unit (GIU) for display on a, internal or external display device. In one embodiment, each MZC device executes multiple overlay nodes, e.g., overlay node 1 and overlay node 2 for receiving Flow 1 and Flow 2 separately. Flow 1 is delivered to a first destination node ON1 and flow 2 is delivered to a second destination node ON2, both existing or executed on the same MZC device. In this way, the MZC device can process multiple sessions with multiple separated flows.

Overlay Network

Figure 8:
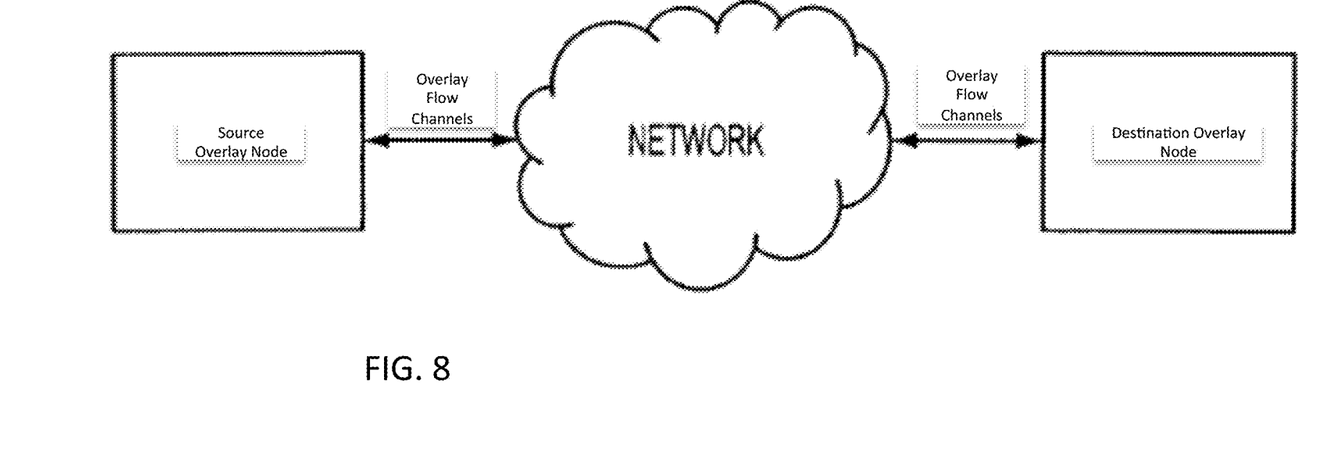
FIG. 8 shows an overlay network built on top of the network of FIG. 4.

FIG. 8 shows an overlay network connected to an OFTN communication controller at the OFTN or data center site within a network that passes various information amongst source and destination overlay nodes, each executing overlay processes. Preferably, each overlay node is managed by its own process (daemon), thereby allowing efficient utilization of multi-core, multi-processor modern computer architectures.

A flow channel is a connection from a single source node to one or more destination nodes for transporting flows, including any physical, logical or virtual components that create the connection. A flow channel connectivity policy describes the allowable connections between overlay nodes. Essentially, this policy is an access control policy defining which overlay nodes may directly communicate via flow channels provided by the OFTN.

Figure 9:
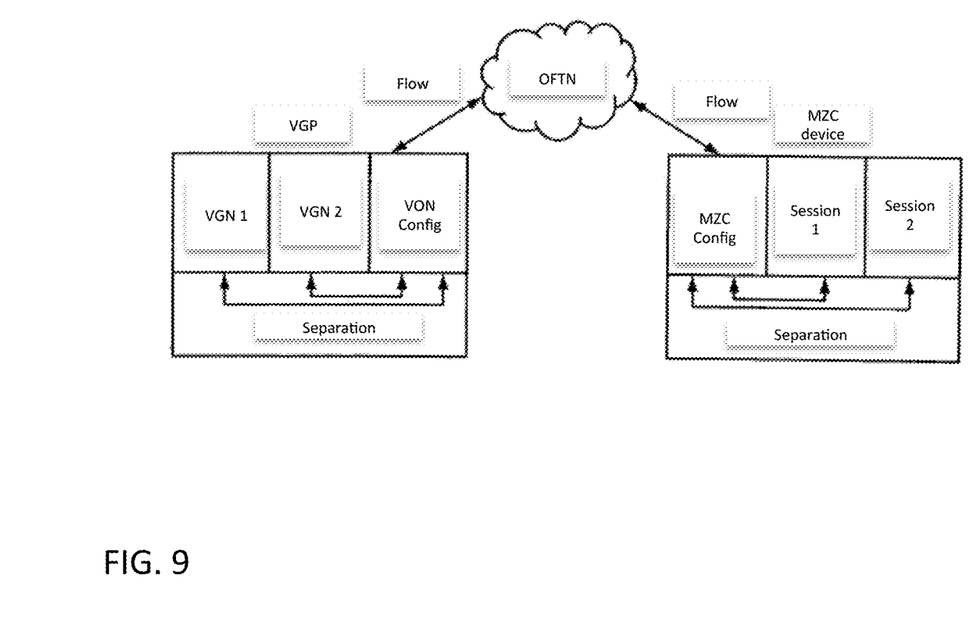
FIG. 9 shows a block diagram of a flow delivery from the VGP of FIG. 2 to the MCZ device of FIG. 7.

FIG. 9 shows a block diagram for flow delivery from the VGP of FIG. 2 to the MZC device. The VGP creates a plurality of source VGNs that generated flows delivered to a plurality of destination overlay node sessions at the MZC device. The MZC device must first establish connections with the OFTN. When the MZC device connects to the OFTN, directly or through an access node, a short handshaking protocol exchange establishes a shared state with the MZC device. This shared state includes what port numbers they are communicating on, flow control settings, available buffer space, choice of reliability protocol, and identifiers for the multiple sessions. Each MZC device maintains multiple sessions, including a first MZC session having a first ID associated with a first VGN for a first flow and a second MZC session having a second ID associated with a second VGN for a second flow separated from the first flow. Flow separation is provided via virtualizing VOP processes in a plurality of VONs. Based on the foregoing description, a plurality of zero client nodes are remote to one or more central nodes. Each zero client node executes a separating operating system for separating the two or more display sessions from each other based on a separation configuration that implements a separation policy for the two or more graphics flows.

Figure 10:
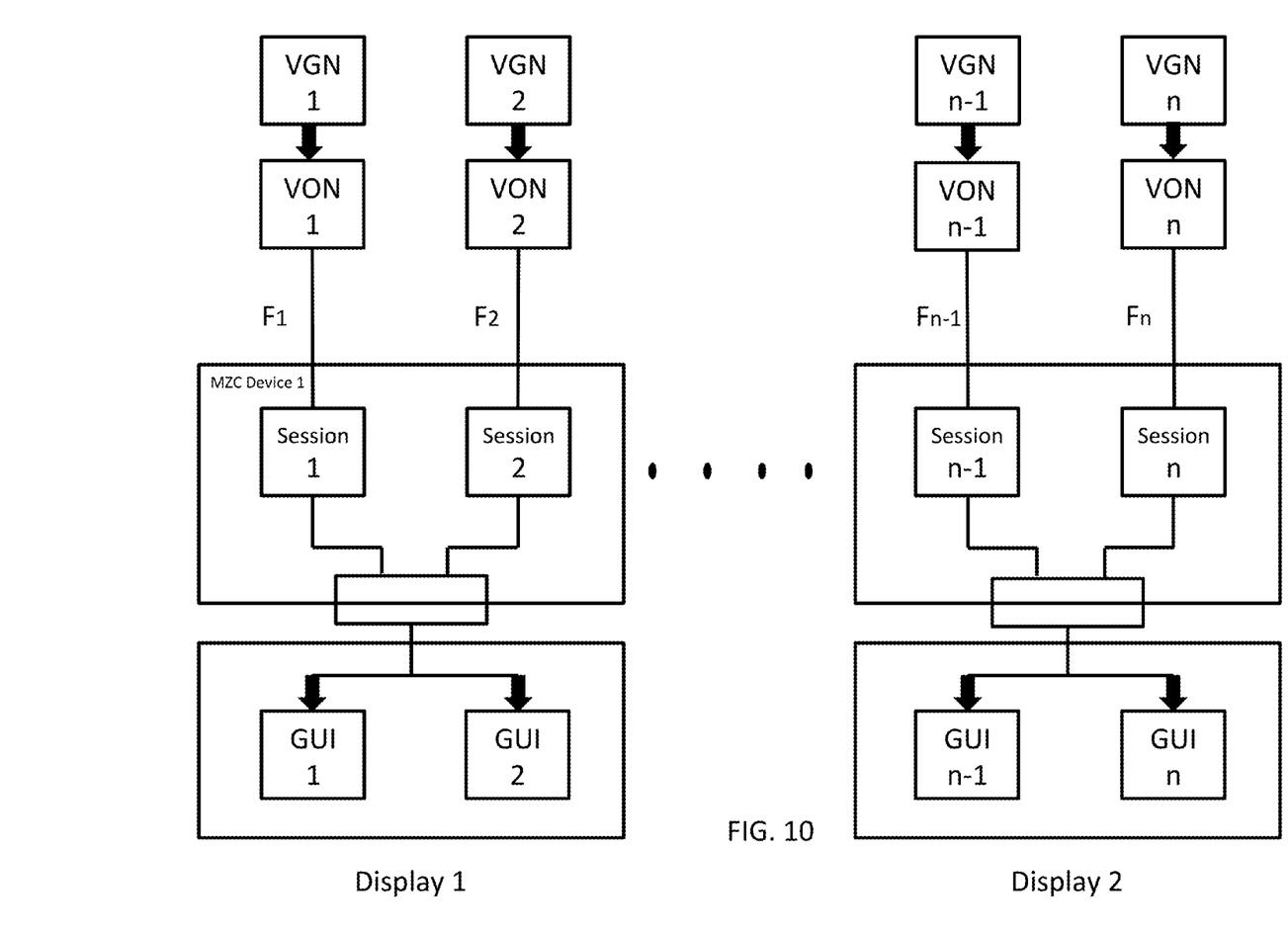
FIG. 10 shows a block diagram for transport of a plurality of graphical user interfaces GUI 1-$n$ to be displayed in multiple sessions on each one of two display units.

FIG. 10 shows a block diagram for transport of a plurality of graphical user interfaces GUI 1-n to be displayed in multiple sessions on each one of two display units. As shown, Display 1 display GUI 1 and GU2 and Display 2 displays GUI n-1 and GUI n. The GUIs are received as flows associated with at MZC device 1 and MZC device 2 separately. MCZ device 1 runs Session 1 and Session 2 that separately receive flow F1 and flow F2 via an overlay network of VON 1 thru VON n. MCZ device 2 runs Session n and Session n-1 to receive flow Fn-1 and flow Fn via VONn-1 and VON n. VON 1 thru VON n each receive a separate flow generated at each one of the VGN 1 through VGN n. Each VGN generates flows based on an application under the control of an operating system having a corresponding GUI. In one example, Microsoft Windows and Unix GUIs can be displayed by an MZC device simultaneously. As described above, a plurality of zero client nodes are remote to the one or more central nodes. Each zero client node executes a separating operating system for separating the two or more display sessions from each other based on a separation configuration that implements a separation policy for the two or more graphics flows.

From the foregoing, it is clear that the present invention uses network architecture to support the transport and delivery of a large number of flows from any source node to any destination node over any network, such as an IP network, on a global scale. For example, the architecture allows any content provider or enterprise, e.g., Microsoft, IBM, Apple, NetFlix, Amazon, Yahoo, Google, to deliver live flows uniquely to a large number of receiver overlay nodes. In one embodiment, the large scale is achieved through the utilization of multiple computers or servers with multi-core processor architecture in these computers that implement virtual networks, interfaces and devices.

The invention claimed is:

1. A network of nodes configured to transport a plurality of flows from one or more central nodes to a plurality of display sessions executed in a plurality of remote zero client nodes, comprising:

a plurality of central processing units in the one or more central nodes configured to execute a plurality of processes that operate under the control of one or more central operating systems; and a plurality of virtual nodes in the one or more central nodes that are isolated from each other by hardware simulation, said plurality of virtual nodes comprising 1) a plurality of virtual graphics nodes configured to concurrently process graphics flows used in the plurality of display sessions at the plurality of remote zero client nodes and 2) a plurality of virtual switches that switch the concurrently processed graphic flows from the plurality of virtual graphics nodes to the plurality of remote zero client nodes, wherein a virtual node is isolated by isolating a virtual graphic node and virtual switch in a corresponding virtual node from another virtual graphic node and virtual switch in another corresponding virtual node; and a plurality of sender and receiver nodes configured to transport two or more graphic flows over the network that are used simultaneously in two or more display sessions at a single remote zero client node, which executes a separating operating system for separating the two or more display sessions from each other based on a separation configuration that implements a separation policy for the two or more graphics flows.

2. The network of claim 1, wherein a virtual node hosts a desktop operating system allowing the single remote zero client device to access an application.

3. The network of claim 1, wherein the plurality of virtual nodes further comprise a plurality of virtual audio nodes configured to concurrently process audio flows used in the plurality of display sessions at the plurality of remote zero client nodes.

4. The network of claim 1, wherein the plurality of virtual nodes further comprising a plurality virtual network interface cards coupled to the plurality of virtual switches.

5. The network of claim 1, wherein the two or more graphic flows are displayed according to a remote desktop protocol comprising at least one of RemoteFX, PCoIP or HDX.

6. The network of claim 1, further comprising a virtual infrastructure client configured to interface with the single remote zero client node.

7. The network of claim 1, wherein each virtual graphics node executes a virtual graphics application to generate a graphic flow, said virtual graphics application comprising at least one of Silverlight, Flash, Windows Aero.

8. The network of claim 1, wherein each virtual graphics node executes a virtual graphics application to generate a graphic flow, said virtual graphics application comprising an interactive application.

9. The network of claim 1, wherein the one or more central operating systems comprise a plurality of separating operating systems, each controlling one of the plurality of virtual nodes.

10. The network of claim 1, wherein network comprises an overlay network of overlay processes executing on overlay nodes connected to each other by links in a computer network that is built on top of an underlying network of nodes.

11. A system that transports a plurality of flows, comprising one or more central nodes having a plurality of central processing units configured to execute a plurality of processes that operate under the control of one or more central operating systems; and a plurality of virtual nodes in the one or more central nodes, wherein each virtual node is configured to execute processes that isolate said plurality of virtual nodes from each other based on hardware simulation of 1) a plurality of virtual graphics nodes that concurrently process graphics flows used in a plurality of the display sessions at the plurality of remote zero client nodes and 2) a plurality of virtual switches that switch packets associated with the concurrently processed graphic flows; and a plurality of sender and receiver nodes configured to transport two or more graphic flows that are used simultaneously in two or more display sessions at a single remote zero client node; and a plurality of zero client nodes that are remote to the one or more central nodes, wherein each zero client node executes a separating operating system for separating the two or more display sessions from each other based on a separation configuration that implements a separation policy for the two or more graphics flows.

12. The system of claim 11, wherein the plurality of virtual nodes further comprise a plurality of virtual audio nodes configured to concurrently process audio flows used in the plurality of display sessions at the plurality of remote zero client nodes.

13. The system of claim 12, wherein the two or more graphic flows comprise video flows delivered to each one of the two or more display sessions at the single remote zero client node along with an audio flow delivered to each one of the two or more display sessions.

14. The system of claim 11, wherein the two or more graphic flows comprise graphical user interfaces delivered to each one of the two or more display sessions at the single remote zero client node.

15. The system of claim 11, wherein the two or more graphic flows comprise video flows delivered to each one of the two or more display sessions at the single remote zero client node.

16. The system of claim 11, wherein the one or more central nodes and the single remote zero client node comprise overlay nodes.

17. A method for transporting a plurality of flows comprising the steps of:

executing a plurality of processes that operate under the control of one or more central operating systems in one or more central nodes; and executing a plurality of virtual nodes in the one or more central nodes, wherein each virtual node is configured to execute processes that isolate said plurality of virtual nodes from each other based on hardware simulation of 1) a plurality of virtual graphics nodes that concurrently process graphics flows used in a plurality of the display sessions at the plurality of remote zero client nodes and 2) a plurality of virtual switches that switch packets associated with the concurrently processed graphic flows; and transporting two or more graphic flows that are used simultaneously in two or more display sessions at a plurality of zero client nodes that are remote to the one or more central nodes, wherein each zero client node executes a separating operating system for separating the two or more display sessions from each other based on a separation configuration that implements a separation policy for the two or more graphics flows.

18. The method of claim 17, further comprising the step of executing a plurality of virtual audio nodes configured to concurrently process audio flows used in the plurality of display sessions at the plurality of remote zero client nodes.

19. The method of claim 18, wherein the two or more graphic flows comprise video flows delivered to each one of the two or more display sessions at the single remote zero client node along with an audio flow delivered to each one of the two or more display sessions.

20. The method of claim 17, wherein the two or more graphic flows comprise graphical user interfaces delivered to each one of the two or more display sessions at the single remote zero client node.

* * * * *